United States Patent
Fuchs et al.

(10) Patent No.: US 7,915,599 B2
(45) Date of Patent: Mar. 29, 2011

(54) RADIATION TRANSDUCER AND METHOD TO PRODUCE A RADIATION TRANSDUCER

(75) Inventors: Manfred Fuchs, Nuremberg (DE); Oliver Kirch, Erlangen (DE); Georg Wittmann, Herzogenaurach (DE)

(73) Assignee: Siemens Aktiengesellschaft, Munich (DE)

( * ) Notice: Subject to any disclaimer, the term of this patent is extended or adjusted under 35 U.S.C. 154(b) by 113 days.

(21) Appl. No.: 12/372,861

(22) Filed: Feb. 18, 2009

(65) Prior Publication Data

US 2009/0206266 A1    Aug. 20, 2009

(30) Foreign Application Priority Data

Feb. 18, 2008    (DE) .................. 10 2008 009 676

(51) Int. Cl.
*G01J 1/58*    (2006.01)
(52) U.S. Cl. .................................... 250/483.1
(58) Field of Classification Search ............... 250/483.1, 250/484.2–484.5
See application file for complete search history.

(56) References Cited

U.S. PATENT DOCUMENTS

| | | | | |
|---|---|---|---|---|
| 2,890,209 A | * | 6/1959 | Phillips et al. ............... | 528/361 |
| 3,880,799 A | * | 4/1975 | Hoogeboom ................. | 524/109 |
| 4,001,095 A | * | 1/1977 | Nakatani ................. | 204/157.41 |
| 4,059,768 A | * | 11/1977 | Van Landeghem et al. ............... | 250/483.1 |
| 4,645,721 A | * | 2/1987 | Arakawa et al. ............... | 428/690 |
| 4,985,071 A | * | 1/1991 | Tabata et al. ................ | 75/246 |
| 5,641,967 A | * | 6/1997 | Bringley et al. ............ | 250/484.4 |
| 6,476,395 B2 | * | 11/2002 | Boerner et al. ............... | 250/368 |
| 2002/0132900 A1 | * | 9/2002 | Barrera et al. ................ | 524/454 |
| 2006/0099335 A1 | * | 5/2006 | Sakai et al. ................ | 427/171 |
| 2007/0127127 A1 | * | 6/2007 | Hsu et al. ................ | 359/599 |
| 2008/0224048 A1 | | 9/2008 | Fuchs et al. | |
| 2008/0261015 A1 | * | 10/2008 | Okajima et al. ............ | 428/304.4 |

FOREIGN PATENT DOCUMENTS

DE    10 2006 022 138    11/2007

OTHER PUBLICATIONS

"Flachbilddetektoren in der Röntgendiagnostik" Spahn et al., Radiologe, vol. 43 (2003), pp. 340-350.

* cited by examiner

*Primary Examiner* — David P Porta
*Assistant Examiner* — Kiho Kim
(74) *Attorney, Agent, or Firm* — Schiff Hardin LLP

(57) ABSTRACT

A radiation transducer has a luminophore layer applied on a substrate, and at least one anti-discoloration substance is applied on the luminophore layer. In a method to produce a radiation transducer a luminophore layer is applied on a substrate, and at least one anti-discoloration substance is applied on the luminophore layer after the application of the luminophore layer on the substrate.

9 Claims, 1 Drawing Sheet

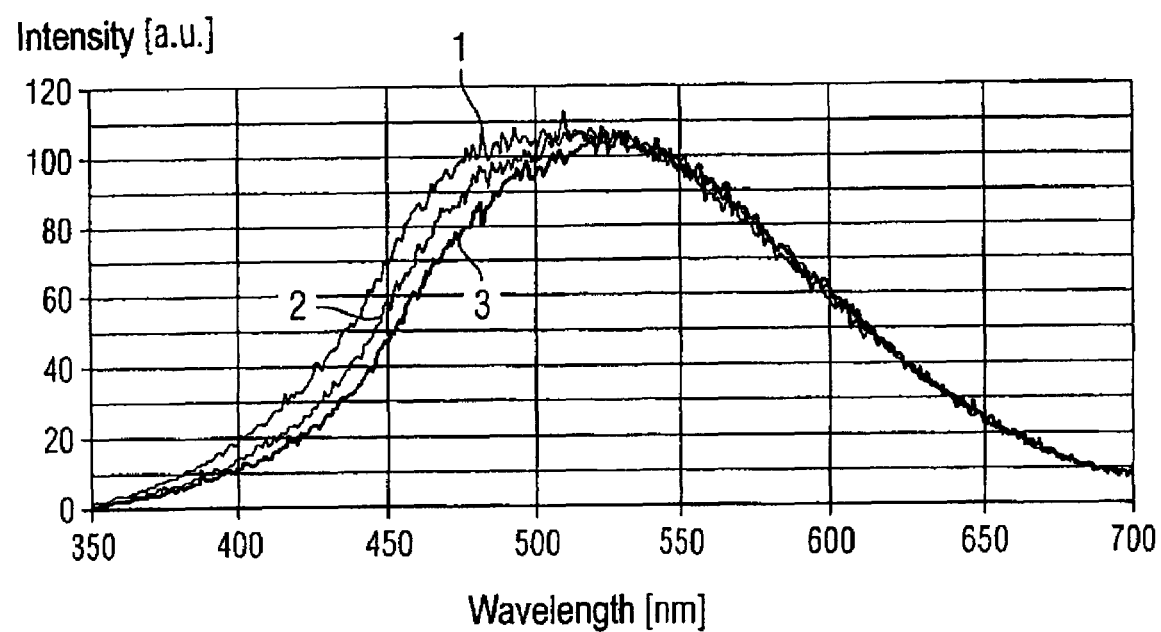

RADIATION TRANSDUCER AND METHOD TO PRODUCE A RADIATION TRANSDUCER

BACKGROUND OF THE INVENTION

1. Field of the Invention

The present invention concerns a radiation transducer of the type in which a luminophore layer is applied on a substrate. The invention furthermore concerns a method to produce a radiation transducer of this type.

2. Description of the Prior Art

A radiation transducer of the above type is used in a digital x-ray detector (flat panel detector) in combination with an active matrix that is sub-divided into a number of pixel readout units with photodiodes. The incident x-ray radiation is initially converted in the luminophore layer (scintillator layer) of the radiation transducer into visible light that is transducer by the photodiodes into electrical charge and stored with spatial resolution. This conversion, known as an indirect conversion, is described in the article by M. Spahn et al., "Flachbilddetektoren in der Röntgendiagnostik" ("Flat panel detectors in x-ray diagnostics") in "Der Radiologe 43 (2003)", Pages 340 through 350, for example.

Typical luminophore layers are composed of CsI:Tl, CsI: Na, NaI:Tl or similar materials that contain alkali halogenides. CsI is particularly well suited as a scintillator material since it can be grown in needle shapes. A good spatial resolution of the x-ray image is thereby obtained in spite of a greater layer thicknesses (which ensures an optimal absorption of the x-ray radiation). The good spatial resolution results from what is known as the "optical wave guide effect" that is achieved by the air gaps between the CsI needles.

Due to their content of alkali halogenides, the scintillator materials are at least slightly hygroscopic and must be sufficiently protected from damaging environmental influences (humidity excessively high temperature). For example, under the influence of temperature, humidity and air the CsI needles can merge into one another (degradation). The important air gap parameter is severely reduced. As a result of this the spatial resolution is reduced (measurement variable MTF—Modulation Transfer Function).

To avoid such degradation, the scintillator layers are protected with a suitable encapsulation ("packaging"), as this is described in DE 10 2006 022 138 A1, for example. A "yellowing" of the luminophore layer occurs in the course of this packaging process, which leads to an impairment of the light yield.

The detectors mentioned above (CCD chip, photodiodes etc.) normally have the greatest sensitivity in the spectral range from 500 to 520 nm. In contrast to this, most scintillators (radiation transducers) based on alkali halogenides (for example CsI:Tl) and described in the literature have a radiation maximum of 540 to 560 nm. As described in WO 2007/012564 A1, the scintillator layer of the radiation transducer is modified based on this such that the shortwave branch of the emission spectrum (50% values) of the radiation transducer is shifted from 480 nm to a smaller 440 nm. The maximum of the emission is shifted from 540 nm to 560 nm to a value around 500 nm. For this purpose, the content of Tl in the scintillator layer is 200 ppm to 2,000 ppm.

The applied packaging process leads to a "yellowing" (blue-green light is more strongly absorbed) of the converter layer, accompanied by a step-by-step shift of the shortwave branch of the emission spectrum back from 430 nm to 460 nm (50% values). This leads to the described impairment of the light yield since the maximum of the emission spectrum of the luminophore layer becomes separated step-by-step from the maximum sensitivity of the detector.

SUMMARY OF THE INVENTION

An object of the present invention is to provide a radiation transducer that has a higher light yield. The invention is furthermore based on the object to achieve a method for production of a radiation transducer with a higher light yield.

The radiation transducer according to the invention has a substrate on which a luminophore layer is applied. According to the invention, at least one anti-discoloration substance is applied on the luminophore layer.

If the inventive method for production of a radiation transducer, a luminophore layer is applied on a substrate and after the application on the substrate, at least one anti-discoloration substance is applied on the luminophore layer.

Upon application on the luminophore layer, the anti-discoloration substance penetrates at least partially into the needle interstices of the luminophore layer (scintillator layer).

BRIEF DESCRIPTION OF THE DRAWING

The single FIGURE plots intensity versus arbitrary units (a.u.) for a luminophore layer according to the prior art, a luminophore according to the invention before additional packaging processes, and a luminophore according to the invention after additional packaging processes.

DESCRIPTION OF THE PREFERRED EMBODIMENTS

In the radiation transducer according to the invention, the oxidation state of the luminophore layer (scintillator layer) is fixed by the application of the anti-discoloration substance before the additional processing, which essentially forms an encapsulation (packaging) of the scintillator layer. A yellowing of the luminophore layer in the packaging process is very significantly reduced or even entirely prevented. This causes the light yield of the luminophore layer in the radiation transducer according to the invention to be thus significantly higher, by approximately 10 to 15%.

An additional yellowing during the lifespan of the radiation transducer due to environmental influences (moisture temperature) is also significantly reduced or even entirely prevented by the anti-discoloration substance.

In an embodiment the inventive method, the oxidation state of the luminophore layer (scintillator layer) is fixed via the application of at least one anti-discoloration substance. The anti-discoloration substance is thereby applied directly after the vaporization process. A discoloration of the luminophore layer during the later additional processing is significantly reduced or even entirely prevented. In contrast to known radiation transducers, a radiation transducer produced according to the inventive method has a light yield higher by 10 to 15% since the use according to the invention of an anti-discoloration substance at least very significantly reduces or even entirely prevents a yellowing of the luminophore layer (scintillator layer). The shift of the maximum of the emission spectrum that occurs in the known radiation transducers thereby occurs only to a very slight degree, or not at all.

In the scope of the invention, the anti-discoloration substance can contain at least one organic component active in an oxidative manner and/or one organic component active in an reductive manner and/or one inorganic component active in an oxidative manner and/or one inorganic component active in an oxidative manner.

The anti-discoloration substance can advantageously be activated by an activation process after application on the luminophore layer. For example, the activation process can be a thermal activation process or a photochemical activation process.

In the organic component of the anti-discoloration substance acting in an oxidative manner is particularly advantageously 3,4-epoxycyclohexylmethyl-3,4-epoxycyclohexylcarboxylate, wherein a solution of 3,4-epoxycyclohexylmethyl-3,4-epoxycyclohexylcarboxylate in acetone ($C_3H_6O$) or in ethanol ($C_2H_6O$) has proven to be particularly suitable from a process point of view. In the scope of the invention, the anti-discoloration substance can also be dissolved in a different solvent than acetone or ethanol.

In the scope of the invention, the anti-discoloration substance can be applied directly as a solid or dissolved in an arbitrary organic and/or inorganic solvent, pigmented or suspended. Furthermore, it is possible to apply the anti-discoloration substance as a fluid directly or dissolved or emulsified in an arbitrary organic and/or inorganic solvent. As an additional alternative, the anti-discoloration substance can be applied as a gas directly or dissolved in an arbitrary organic and/or inorganic solvent.

Dependent of its aggregate state, the anti-discoloration substance can ensue via spraying and/or by immersion and/or by a gas phase deposition.

Furthermore, the anti-discoloration substance can also be applied via a scraping method, by a printing method or by a spin coating method.

Three normalized emission spectra of a known radiation transducer are shown in the FIGURE, the luminophore layer of which radiation transducer consists of cesium iodide doped with thallium (CsI:Tl) and has a coating with potassium (K). All three emission spectra were acquired after the respective process step, wherein the shelf life thereby progresses even in an inert environment (nitrogen gas $N_2$).

The presented energy spectra respectively has three individual peaks (which are not shown for reasons of clarity).

As described in detail in WO 2007/012564 A1, these individual peaks respectively has a maximum at approximately 400 nm (blue spectral color), 480 nm (blue-green spectral color) and 560 nm (green spectral color).

In the FIGURE, the emission spectrum of the radiation transducer after the vacuum deposition of the luminophore layer (scintillator layer made up of CsI:Tl,K) and before the first packaging process (encapsulation with parylene) is designated with 1.

An emission spectrum designated with 2 relates to the aforementioned radiation transducer after the application of the first protective layer of parylene and before the additional packaging processes.

An additional emission spectrum that is designated with 3 relates to the aforementioned radiation transducer after the complete packaging process according to DE 10 2006 022 138 A1.

As is apparent without further measures from the comparison of the three emission spectra, in the course of the production process in the production of the individual packaging layers the light yield by the luminophore layer (scintillator layer) is reduced by "yellowing" (decrease of the "blue-green" branch of the emission spectrum). The "green" branch of the spectrum is not affected by the "yellowing".

If an anti-discoloration substance is sprayed on after the CsI vaporization, and if the additional packaging steps are then implemented, the emission spectrum 1 remains nearly unaffected (not shown).

Such a luminophore layer (scintillator layer) protected from yellowing with an anti-discoloration substance and with applied packaging layers remains stable and does not yellow, even given storage under disadvantageous environment conditions, for example increased temperature (for example 70° C.) and increased humidity (for example over 50° relative moisture).

Although modifications and changes may be suggested by those skilled in the art, it is the intention of the inventors to embody within the patent warranted hereon all changes and modifications as reasonably and properly come within the scope of their contribution to the art.

We claim as our invention:

1. A method to produce a radiation transducer comprising applying a luminophore layer on a substrate, and applying at least one anti-discoloration substance on the luminophore layer by an activation process after application of the luminophore on the substrate.

2. A method according to claim 1 comprising applying an anti-discoloration substance containing an organic component acting in an oxidative manner.

3. A method according to claim 1 comprising applying an anti-discoloration substance containing an organic component acting in a reductive manner.

4. A method according to claim 1 comprising applying an anti-discoloration substance containing an inorganic component acting in an oxidative manner.

5. A method according to claim 4 comprising applying a solution of 3,4-epoxycyclohexylmethyl-3,4-epoxycyclohexylcarboxylate in acetone or in ethanol as the anti-discoloration substance.

6. A method according to claim 1 comprising applying an anti-discoloration substance containing an inorganic component acting in a reductive manner.

7. A method according to claim 1 comprising activating the anti-discoloration substance with a thermal activation process.

8. A method according to claim 1 comprising activating the anti-discoloration substance with a photochemical activation process.

9. A method according to claim 1 comprising applying an anti-discoloration substance containing 3,4-epoxycyclohexylmethyl-3,4-epoxycyclohexylcarboxylate.

* * * * *